United States Patent
Gensbittel

(10) Patent No.: US 9,776,892 B2
(45) Date of Patent: Oct. 3, 2017

(54) PROCESS FOR TREATING WATER WITH A COUNTER-CURRENT ION EXCHANGE UNIT INCLUDING SILICA AND BORON CONCENTATRATION MONITORING AND REGENERATION THEREOF

(71) Applicant: Ovivo Luxembourg S.à.r.l., Munsbach (LU)

(72) Inventor: Dominique Gensbittel, Michelbach-le-bas (FR)

(73) Assignee: Ovivo, Inc., Montreal (CA)

( * ) Notice: Subject to any disclaimer, the term of this patent is extended or adjusted under 35 U.S.C. 154(b) by 226 days.

(21) Appl. No.: 14/083,945

(22) Filed: Nov. 19, 2013

(65) Prior Publication Data
US 2014/0138318 A1   May 22, 2014

(30) Foreign Application Priority Data
Nov. 21, 2012  (EP) .................................... 12193683

(51) Int. Cl.
| | |
|---|---|
| *C02F 1/42* | (2006.01) |
| *B01J 49/85* | (2017.01) |
| *B01D 15/36* | (2006.01) |
| *B01J 41/05* | (2017.01) |
| *B01J 47/022* | (2017.01) |

(Continued)

(52) U.S. Cl.
CPC ............. *C02F 1/42* (2013.01); *B01D 15/363* (2013.01); *B01J 41/05* (2017.01); *B01J 49/85* (2017.01); *B01J 47/022* (2013.01); *B01J 49/07* (2017.01); *C02F 2001/422* (2013.01); *C02F 2101/10* (2013.01); *C02F 2101/108* (2013.01);
(Continued)

(58) Field of Classification Search
CPC .. C02F 1/42; C02F 2101/10; C02F 2101/108; C02F 2103/04; C02F 2001/422; C02F 2303/16; B01J 47/026; B01J 49/0013; B01J 47/022; B01J 49/07; B01J 49/85
USPC .......................... 210/290, 662, 683, 678, 900
See application file for complete search history.

(56) References Cited

U.S. PATENT DOCUMENTS 3,875,053 A * 4/1975 Siegers .................. B01D 15/00
                                                        210/269
3,975,267 A * 8/1976 Wendel .................... B01J 39/04
                                                        210/678
(Continued)

FOREIGN PATENT DOCUMENTS

JP          60216882 A  * 10/1985
WO       WO 0212129 A1 *  2/2002  ........... G01N 27/021

OTHER PUBLICATIONS

English Language Abstract for JP 60-216882 A downloaded from the J-PlatPat website on Dec. 29, 2015, URL: <https://www.j-platpat.inpit.go.jp/web/all/top/BTmTopEnglishPage>.*

(Continued)

*Primary Examiner* — Matthew O Savage
(74) *Attorney, Agent, or Firm* — James Earl Lowe, Jr.

(57) ABSTRACT

A process is described for treating water, in particular for obtaining ultrapure water, in which a decationized water stream is passed at least through a first strong base anion exchange bed and a second strong base anion exchange bed, which is arranged downstream, in particular directly downstream, of the first strong base anion exchange bed. Furthermore, a water treatment system and a counter-current ion exchange unit for carrying out such a process are described.

9 Claims, 2 Drawing Sheets

(51) Int. Cl.
    *B01J 49/07*     (2017.01)
    *C02F 101/10*    (2006.01)
    *C02F 103/04*    (2006.01)

(52) U.S. Cl.
    CPC ...... *C02F 2103/04* (2013.01); *C02F 2301/08* (2013.01); *C02F 2303/16* (2013.01)

(56) References Cited

U.S. PATENT DOCUMENTS

| | | | | |
|---|---|---|---|---|
| 4,461,706 A | * | 7/1984 | Siegers | B01D 15/02 210/275 |
| 4,851,122 A | * | 7/1989 | Stanley | B01J 39/04 210/290 |
| 2005/0269269 A1 | | 12/2005 | Jensen | |
| 2006/0021944 A1 | * | 2/2006 | Carson | B01J 49/0004 210/673 |
| 2007/0215550 A1 | * | 9/2007 | Brings | B01J 39/043 210/660 |

OTHER PUBLICATIONS

Sybron Chemicals, IONAC ASB-2 Product Information, publication date unknown, 3 pages.*
Konrad Dorfner, Ion Exchangers, Jan. 1991, Walter de Gruyler, p. 1436.*

\* cited by examiner

PROCESS FOR TREATING WATER WITH A COUNTER-CURRENT ION EXCHANGE UNIT INCLUDING SILICA AND BORON CONCENTATRATION MONITORING AND REGENERATION THEREOF

BACKGROUND

The invention relates to a process for treating water, in particular for obtaining ultrapure water. The invention further relates to a water treatment system and counter-current ion exchange unit for carrying out such a process.

The treatment of water is currently of constantly increasing importance, in particular in the field of obtaining drinking water, and also in the production of high-purity process water. Particularly high demands are made in respect of the water purity, in particular in the latter case, for example in the case of process waters which are required in the production of semiconductors. For instance, in semiconductor production, water having an extremely high degree of purity is required for washing silicon wafers, in particular after etching processes.

The starting point for producing the required high-purity water can be surface water, for example river water, or ground water (for example well water). This is typically purified in a multistage process comprising a pretreatment section, what is termed a "make-up" section, and what is termed a "polishing" section.

The pretreatment generally comprises in particular one or more filtration steps for removing rough and fine particles plus eventually a flocculation step for removing colloid substances and very fine dirt particles, an adsorption step (activated carbon usually), a softening step and/or a demineralisation step of the raw water by means of ion exchange resins and/or reverse osmosis membranes. Subsequently, the water thus treated is, in the make-up section, degassed, deionized and treated with UV. A further UV treatment can be provided during polishing. In addition, the polishing generally comprises further deionization processes and also at least one ultrafiltration step.

The raw water to be treated generally contains inorganic and organic constituents or impurities which must be removed as far as possible during the treatment. As regards such constituents and impurities, respectively, it is particularly referred to organically bound carbon ("total organic carbon, TOC"), silica and boron.

Boron can usually be removed as boric acid by means of strong base anion exchangers.

However, the affinity of these exchangers for boron is generally low resulting in a low removing capacity (mgram boron per liter strong base anion exchanger) and in a very early breakthrough (elution) of boron. Typically, boron breaks through as the first impurity when the strong base anion exchanger becomes exhausted.

In other words, when, for instance, breakthrough and elution, respectively of silica is detected at an outlet of a strong base anion exchanger, normally boron is already eluted to at least a significant extent.

Thus, for controlling boron removal, according to a conventional process, silica concentration is measured in a strong base anion exchanger, at approximately 20 to 30 cm upstream of the outlet of the exchanger, thereby relying on that short layer downstream of the silica measurement to catch the boron front displaced by the silica front.

However, this approach suffers from the withdrawal that no real boron control is possible (except through grab samples for laboratory measurements). Further this conventional process is only possible as long as the boron concentration in the feed water is stable and does not exceed a range of about 50 to about 100 ppb (parts per billions).

SUMMARY

Thus, the object underlying the present invention is to provide a technical solution for treating water, in particular a process for producing ultrapure water, which especially addresses an optimized control of boron breakthrough and reduced boron leakage, respectively, especially at higher feed concentrations.

This object is achieved by the claimed invention. The wording of all claims is incorporated by reference into the content of this description.

A process according to the invention serves for treating, in particular pretreating, of water. In particular, the process serves for obtaining ultrapure water.

The process is especially useful for removing boron from raw water, preferably during a pretreatment section for obtaining ultrapure water. Along boron further impurities, in particular selected from the group consisting of weak acids such as organic acids, carbon dioxide, silica and mixtures thereof, can be removed by the aid of the process according to the present invention.

In the process a water stream, typically a decationized water stream, is passed at least through a first strong base anion exchange bed and a second strong base anion exchange bed. The second strong base anion exchange bed is arranged downstream of the first strong base anion exchange bed.

For providing a decationized water stream, a cation exchange bed may be arranged upstream of the first strong base anion exchange bed, in particular upstream of a weak base anion exchange bed such as described in more details in the following, preferably upstream of a counter-current ion exchange unit as also described in more details in the following.

The present invention is based on the finding that adding a further strong base anion exchange bed downstream of a first strong base anion exchange bed results in a better removal of boron from a water stream. The further (i.e. second) strong base anion exchange bed advantageously catches the boron front which is displaced at an outlet of the first strong base anion exchange bed. In that regard, the further strong base anion exchange bed may be advantageously designed for removing specifically that boron front.

Along boron, the second strong base anion exchange bed (like the first strong base anion exchange bed) may advantageously serve for removing leakages of weak acids such as organic acids, carbon dioxide, silica, or the like.

The term "strong base anion exchange bed" as used according to the invention relates to an exchange bed comprising a resin which bears in its unloaded state cationic groups being capable of exchanging anions. Suitable resins are typically polystyrene resins or polystyrene based resins, preferably bearing quaternary ammonium groups which are paired with hydroxide ions as counter-ions in their unloaded state. The quaternary ammonium groups may have one, two, three or four organic residues such as alkyl residues, for instance methyl, ethyl, propyl, or the like, residues. The quaternary ammonium groups used for boron removal preferably have three methyl residues (groups)—therefore called trimethylammonium groups. Trimethylammonium groups bearing resins are known as strong base anion exchangers of type 1.

The term "decationized water stream" as used according to the invention relates to a water stream whose cations (other than $H^+$-ions) such as $Mg^{2+}$, $Ca^{2+}$ or the like were (at least extensively) replaced by $H^+$-ions.

The term "boron" as used according to the invention may not only encompass the element boron but also boric acid ($H_3BO_3$), hydrogen borate ($HBO_3^-$) and borate ($BO_3^{2-}$).

Further, the terms "downstream" and "upstream" as used according to the invention are defined in respect of the flow direction of the water to be treated.

Furthermore, the terms "inlet" and "outlet" as used according to the invention are also used in respect of the flow direction of the water to be treated.

For economic removal of free mineral acids and organic acids it is preferred to pass the water stream at first through a weak base anion exchange bed which is arranged upstream, in particular directly upstream, of the first strong base anion exchange bed. In other words, it reflects a preferred embodiment of the invention to pass the water stream (at least) through a weak base anion exchange bed, a first strong base anion exchange bed being arranged downstream of the weak base anion exchange bed an through a second strong base anion exchange bed being arranged downstream of the first strong base anion exchange bed. The term "weak base anion exchange bed" as used according to the invention relates to an exchange bed comprising a resin, typically a polystyrene resin or polystyrene based resin, bearing in its unloaded state free base functional groups such as tertiary amine groups which do not have a true hydroxide form. They ionize only under acidic conditions and thus bind complete mineral acids and not only anions thereof.

In the following, the first strong base anion exchange bed, the second strong base anion exchange bed and an optionally provided weak base anion exchange bed, in particular as detailed in the preceding description, will be termed as "anion exchange beds".

In a preferred embodiment, the anion exchange beds are connected in series.

Preferably, the second strong base anion exchange bed is arranged directly downstream of the first strong base anion exchange bed. Further, the first strong base anion exchange bed may be arranged directly downstream of an optionally provided weak base anion exchange bed, in particular as detailed in the preceding description.

The phrases "directly downstream" and "directly upstream" mean according to the invention that—apart from one or several optionally provided inert resin layers—no further treating units (such as a filtration unit, flocculation unit, degassing unit, deionisation unit, reverse osmosis unit, or the like) are arranged between the exchange beds.

Generally, the anion exchange beds may be configured as single anion exchange units, typically configured as single columns with separated chambers, namely a first strong base anion exchange chamber, a second strong base anion exchange chamber and an optionally provided weak base anion exchange chamber.

However, according to an especially preferred embodiment, the anion exchange beds, i.e. the first strong base anion exchange bed, the second strong base anion exchange bed and an optionally provided weak base anion exchange bed, in particular as described above, are arranged or combined to form a counter-current ion exchange unit. This is in particular advantageous inasmuch as a counter-current ion exchange unit facilitates regeneration of the anion exchange beds in series (thoroughfare regeneration) in a counter-current mode, expediently in the order (sequence) of the second strong base anion exchange bed, the first strong base anion exchange bed and an optionally provided weak base anion exchange bed. Thus, a very high regeneration grade of the second strong base anion exchange bed and at least a medium regeneration grade of the first strong base anion exchange are achievable. Furthermore, for regeneration of the anion exchange beds, in particular the second strong base anion exchange bed, only a very low amount of additional regeneration solution is required.

In a further embodiment, an inert resin layer is arranged between an optionally provided weak base anion exchange bed, in particular as detailed in the present description, and the first strong base anion exchange bed. Preferably, the resin layer is directly arranged at the outlet of the weak base anion exchange bed. Thus, it can be avoided that an inlet of the first strong base anion exchange bed is blocked by a resin used for the weak base anion exchange bed.

In a further embodiment, an inert resin layer is arranged between the first strong base anion exchange bed and the second strong base anion exchange bed. Preferably, the resin layer is directly arranged at the outlet of the first strong base anion exchange bed. Thus, it can be circumvented that an inlet of the second strong base anion exchange bed is blocked by a resin used for the first strong base anion exchange bed. The inert resin layer may further include a nozzle which may serve as an outlet for sampling water to be tested in respect of an impurity concentration, in particular other than boron concentration. Preferably, the nozzle serves as an outlet for sampling water to be tested in respect of silica concentration, as will be described in more detail in the following.

In a further embodiment, an inert resin layer may be arranged between the second strong base anion exchange bed and an outlet of a counter-current ion exchange unit, in particular as described in the present description. Preferably, the resin layer is directly arranged at the outlet of the second strong base anion exchange bed. Thus, it can be avoided that the outlet of the counter-current ion exchange unit is blocked with resin of the second strong base anion exchange bed. Further, the resin layer contributes to a more homogenous distribution of a regeneration solution during a downflow regeneration process such as depicted in FIG. 1b.

The term "inert resin layer" according to the present invention relates to a layer of resin (without functional groups for the anion exchange process) which is typically featured by larger sized beads than the resins used for the anionic exchange beds. For instance, the inert resin may be made of polypropylene based resin.

In an advantageous embodiment, concentration of an impurity other than boron is monitored in the water stream, particularly in an operational state of the process (without interruption of the process), upstream of the second strong base anion exchange bed.

Preferably, silica concentration is monitored in the water stream, particularly in an operational state of the process, upstream of the second strong base anion exchange bed.

More preferably, silica monitoring is performed by measuring silica breakthrough and elution, respectively, from the first strong base anion exchange bed.

The silica concentration is typically monitored by means of a silica analyzer.

Preferably, the silica concentration is monitored by means of an online silica analyzer. Suitable online silica analyzers are sufficiently known to a person skilled in the art. Such analyzers are typically based on the heteropoly blue method for measuring molybdate-reactive dissolved silica. A person skilled in the art is sufficiently familiar with this method. Thus, it is refrained from any further comments thereon.

Expediently, the silica analyzer is connected to the first strong base anion exchange bed, in particular to an outlet of the first strong base anion exchange bed, or to a nozzle downstream of the first strong base anion exchange bed via a silica sampling line. The nozzle is preferably arranged between the first strong base anion exchange bed and the second strong base anion exchange bed. More preferably, the nozzle may be located in an inert resin layer which is arranged between the first strong base anion exchange bed and the second strong base anion exchange bed (in case of the principle as depicted in FIG. 1).

Preferably, when the silica concentration, in particular silica breakthrough, exceeds a defined threshold value, the treatment process is interrupted and the anion exchange beds are regenerated. This advantageously maintains a high regeneration grade of the second strong base anion exchange bed, thereby avoiding exhaustion of the second strong base anion exchange bed with silica, TOC, or the like. Thus, the second strong base anion exchange bed remains basically fully available for removal of boron. Notwithstanding, the high regeneration grade of the second strong base anion exchange bed achieved by monitoring the silica concentration additionally allows for catching residual silica and/or TOC leakages from the first strong base anion exchange bed. Altogether, the embodiments described in this paragraph contribute to a significantly reduced risk of boron breakthrough from the second strong base anion exchange bed, and thus to a significantly reduced risk of exhausting subsequent treatment sections, in particular a subsequent make-up section and/or polishing section, by boron.

More preferably, the anion exchange beds are regenerated when the silica concentration exceeds a defined threshold value, typically a very low threshold value such as a threshold value of approximately 20 ppb (parts per billion), at the outlet of the first strong base anion exchange bed.

According to a further expedient embodiment, boron concentration, preferably in an operational state of the process, is monitored in the water stream downstream of the second strong base anion exchange bed.

More specifically, the boron concentration may be monitored by measuring the boron breakthrough and elution, respectively, from the second strong base anion exchange bed.

The boron concentration is typically monitored by means of a boron analyzer.

Preferably, the boron concentration is monitored by means of an online boron analyzer. A suitable boron analyzer is sufficiently known to a person skilled in the art. Such analyzer is based on the working principle that within the analyzer boron forms a complex that reduces the resistivity of the treated water. The difference between the two measured resistivities (with and without complex formation) informs about the boron concentration in the sampled water.

In order to monitor the boron concentration, a sample of the water stream is preferably transferred to the boron analyzer via a boron sampling line downstream of the second strong base anion exchange bed, preferably downstream of a counter-current ion exchange unit as described in the preceding description.

In order to facilitate monitoring of the boron concentration in an operational state of the process (online), it may be advantageous to increase resistivity of the water sample above 15 MOhmcm (respectively to decrease the conductivity below 0.067 µS/cm).

For that purpose it may be in particular advantageous to pass the sample of the water stream through a strong acid cation exchange bed downstream of the second strong base anion exchange bed, in particular downstream of a counter-current ion exchange unit as described in the preceding description. Expediently, the strong acid cation exchange bed is arranged upstream of the boron analyzer. The term "strong acid cation exchange bed" according to the invention relates to an exchange bed comprising a resin, typically a polystyrene resin or a polystyrene based resin, which bears in its unloaded state strong acidic groups such as sulfonic acid groups.

The strong acid cation exchange bed advantageously allows for reducing sodium cation concentration in the boron sampling line, thereby increasing resistivity (decreasing conductivity) of the water stream. Preferably, the strong acid cation exchange bed facilitates reduction of sodium cation concentration below 1 ppb (part per billion). The strong acid cation exchange bed is typically configured as a column, preferably as a small column or cartridge which can be filled with one way resin.

Advantageously, the treatment process is interrupted and the anion exchange beds are regenerated when the boron concentration exceeds a defined threshold value, preferably a threshold value of 100 ppt (parts per trillion). Thus, even heavy fluctuations of boron concentration in the feed water stream, for instance concentrations exceeding a range of about 50 to 100 ppb (parts per billion), may be successfully cushioned, thereby avoiding exhaustion of subsequent treating sections, preferably of a subsequent make-up section and/or polishing section, by boron.

As already outlined, the anion exchange beds are preferably regenerated in a counter-current modus. Typically, this can be achieved within an operation modus termed as "upflow exhaustion/downflow regeneration" (such as depicted in FIG. 1a and FIG. 1b) or within an operation modus termed as "downflow exhaustion/upflow regeneration" (such as depicted in FIG. 2a and FIG. 2b).

More specifically, the anion exchange beds are preferably regenerated in the order (sequence) of the second strong base anion exchange bed, the first strong base anion exchange bed and an optionally provided weak base anion exchange bed, in particular as illustrated in the preceding description. By doing so, a very high regeneration grade of the second strong base anion exchange bed and at least a medium regeneration grade of the first strong base anion exchange bed are achievable.

For regeneration of the anion exchange beds an alkaline solution, in particular a warm alkaline solution, preferably a solution having a temperature ranging from 35° C. to 40° C., may be used. Preferably, the alkaline solution is a sodium hydroxide or potassium hydroxide solution, preferably a sodium hydroxide solution.

Generally, the first strong base anion exchange bed and the second strong base anion exchange bed may be made of the same resin.

However, according to a preferred embodiment, the first strong base anion exchange bed and the second strong base anion exchange bed are made from different resins. For instance, the first strong base anion exchange bed may be made from a conventionally gel-type resin (surface pores diameter typically in the range of 1 nm), while the second strong base anion exchange bed may be made from a macroporous resin (surface pores diameter typically in the range of 100 nm). Such a macroporous resin typically allows for a better removal of organics (by adsorptive interactions) than conventional gel-like resins due to a better elution of the large organic molecules through the larger pores during the regeneration phase. In other words, the second strong base anion exchange bed may be specifically designed to remove organics in addition to boron from the water stream.

Preferably, the water stream treatment as illustrated in the preceding description represents a treatment section within an overall process of a water treatment as have already been described at the outset, namely a multi-stage process comprising a pretreatment section, a make-up section and a polishing section. Within this chain, the water stream treatment as described in the preceding description preferably represents the pretreatment section or at least forms part thereof.

Preferably, the water treated by a process according to the invention is defined by a boron concentration below 100 ppt (parts per trillion).

For further features and advantages of the process according to the invention, reference is made in its entirety to the following description.

The invention further relates to a water treatment system, typically a decationized water treatment system, in particular for carrying out the process according to the present invention. The system comprises a first strong base anion exchange bed and a second strong base anion exchange bed which is arranged downstream, in particular directly downstream, of the first strong base anion exchange bed.

In an expedient embodiment, the system additionally comprises a weak base anion exchange bed which is arranged upstream, in particular directly upstream, of the first strong base anion exchange bed.

Preferably, the first strong base anion exchange bed, the second strong base anion exchange bed and an optionally provided weak base anion exchange bed, in particular as described above, in the following termed as "anion exchange beds", are arranged in series.

More preferably, the anion exchange beds are combined to form a counter-current ion exchange unit.

The system may further comprise a silica analyzer. The silica analyzer is preferably arranged upstream of the second strong base anion exchange bed. Expediently, the silica analyzer is connected to an outlet of the first strong base anion exchange bed or to a nozzle downstream of the first strong base anion exchange bed via a silica sampling line.

The system may further comprise a boron analyzer. The boron analyzer is preferably arranged downstream of the second strong base anion exchange bed. Preferably, the boron analyzer is connected to an outlet of the second strong base anion exchange bed, in particular of a counter-current ion exchange unit as described above, via a boron sampling line.

Further, the system may comprise a strong acid cation exchange bed which is preferably arranged in the boron sampling line upstream of the boron analyzer.

Furthermore, the system may comprise at least one filtration unit, in particular ultrafiltration unit, flocculation unit, sterilizing unit, softening unit, desalting unit, degassing unit, deionizing unit, UV treatment unit, reverse osmosis unit, further anion and/or cation exchange bed, or the like.

With respect to further features and advantages it is explicitly referred to the preceding description regarding the process according to the present invention.

Furthermore, the invention pertains to a counter-current ion exchange unit. The counter-current ion exchange unit serves, in particular, for carrying out the process according to the present invention. The unit is especially useful for removing boron from water, in particular during a pretreatment section for obtaining ultrapure water.

The counter-current ion exchange unit comprises a first strong base anion exchange bed and a second strong base anion exchange bed which is arranged downstream, in particular directly downstream, of the first strong base anion exchange bed.

In an expedient embodiment, the counter-current ion exchange unit additionally comprises a weak base anion exchange bed which is arranged upstream, in particular directly upstream, of the first strong base anion exchange bed.

For further features and advantages, it is also explicitly referred to the preceding description regarding the process according to the present invention.

Other features of the invention result from the description hereafter of preferred embodiments in combination with dependent claims. In this case the individual features can be implemented in each case separately or as a plurality in combination with one another in an embodiment of the invention. The particular embodiments serve only for illustration and for a better understanding of the invention and are in no way to be taken as restricting.

BRIEF DESCRIPTION OF THE DRAWINGS

In the drawings:

FIG. 1a and FIG. 1b show a process according to the invention following an upflow exhaustion (in respect of the flow direction of the water to be treated) and a downflow regeneration (in respect of the flow direction of the applied regeneration solution).

FIG. 2a and FIG. 2b show a process according to the invention following a downflow exhaustion (in respect of the flow direction of the water to be treated) and an upflow regeneration (in respect of the flow direction of the applied regeneration solution).

DESCRIPTION OF EMBODIMENTS

Figure 1A:
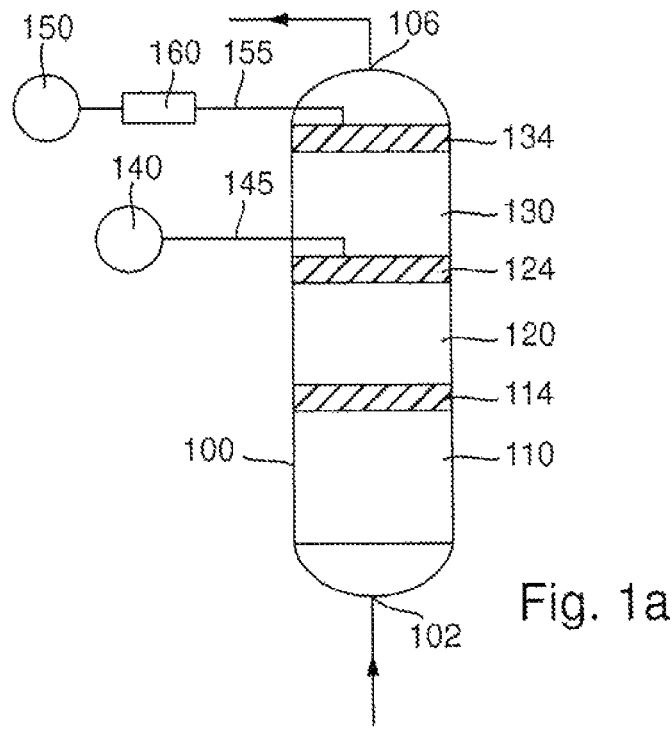
FIG. 1a: schematically shows a flowchart of an embodiment of the process according to the invention in an upflow exhaustion, FIG. 1b schematically shows a flowchart of an embodiment of the process according to the invention in a downflow regeneration.
Figure 1B:
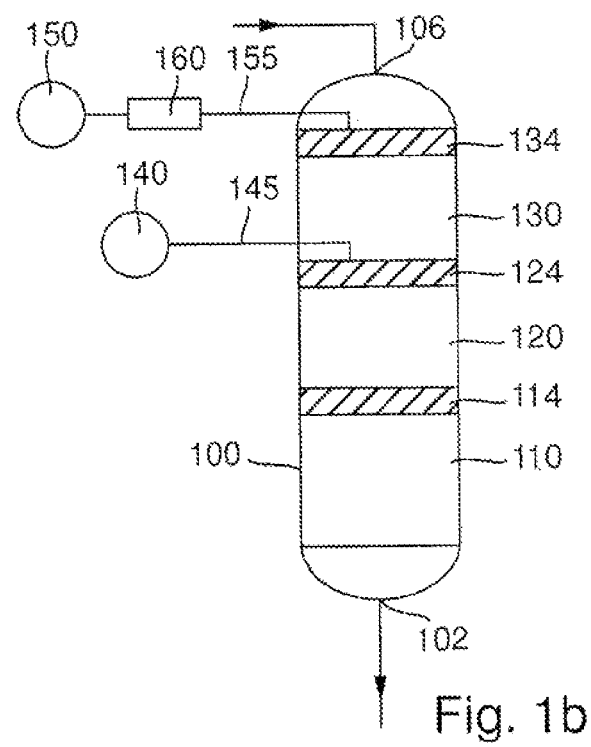
Figure 2A:
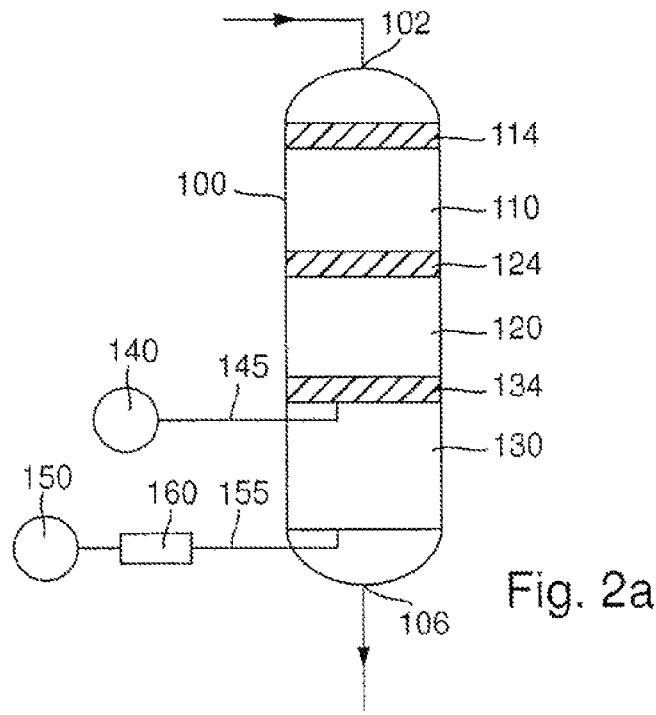
FIG. 2a: schematically shows a flowchart of an alternative embodiment of the process according to the invention in a downflow exhaustion.

Unless explicitly stated something else, the following description refers to the process depicted in FIG. 1 as well as to the process depicted in FIG. 2.

For treatment, in particular pretreatment, the water, typically decationized water, is passed through an inlet 102 of a counter-current ion exchange unit 100 including a weak base anion exchange bed 110, a first strong base anion exchange bed 120 and a second strong base anion exchange bed 130.

Within the counter-current ion exchange unit 100, the anion exchange beds 110; 120; 130 are connected in series, wherein the weak base anion exchange bed 110 is directly arranged upstream of the first strong base anion exchange bed 120 and the first strong base anion exchange bed 120 is directly arranged upstream of the second strong base anion exchange bed 130.

Thus, the water to be treated passes the anion exchange beds in the sequence of the weak base anion exchange bed 110, the first strong base anion exchange bed 120 and the second strong base anion exchange bed 130 (as illustrated by the arrowhead).

During passage of the weak base anion exchange bed 110, the water is mainly freed from mineral acids and organics.

During passage of the first strong base anion exchange bed 120, the water is mainly freed from silica and carbon dioxide. Depending on the resin used for the first strong base anion exchange bed 120, TOC may be removed in addition by that exchange bed.

Since boron is typically the first impurity (or at least one of the first impurities) that breaks through a strong base anion exchange bed, the water is mainly freed from boron when passing the second strong base anion exchange bed 130. Depending on the resin used for the second strong base anion exchange bed 130, TOC may be additionally removed by that exchange bed.

In case of the process principle as depicted in FIG. 1, between the weak base anion exchange bed 110 and the first strong base anion exchange bed 120, in particular at the outlet of the bed 110, an inert resin layer 114 may be arranged. Furthermore, between the first strong base anion exchange bed 120 and the second strong base anion exchange bed 130, in particular at the outlet of the bed 120, an inert resin layer 124 may be arranged. Moreover, between the second strong base anion exchange bed 130 and the outlet 106 of the counter-current ion exchange unit 100, in particular at the outlet of the bed 130, an inert resin layer 134 may be arranged. The resin layer 134 advantageously prevents the outlet 106 from being blocked with resin material of the second strong base anion exchange bed 130. Furthermore, the resin layer 134 facilitates a more homogenous distribution of a regeneration solution such as sodium hydroxide solution within the anion exchange beds 130; 120; 110 during a downflow regeneration process such as depicted in FIG. 1b.

Figure 2B:
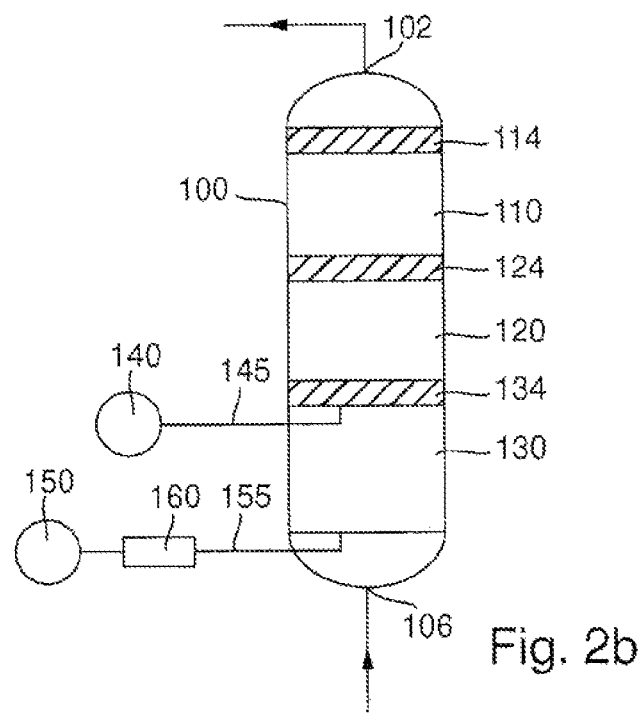
FIG. 2b: schematically shows a flowchart of an alternative embodiment of the process according to the invention in an upflow regeneration.

In case of the process principle as depicted in FIG. 2, between the inlet 102 of the counter-current ion exchange unit 100 and the weak base anion exchange bed 110, in particular at the inlet of the bed 110, an inert resin layer 114 may be arranged in order to facilitate a more homogenous distribution of the water to be treated within the counter-current ion exchange unit 100. This inert resin layer 114 prevents also the top nozzles of the bed 110 to be blocked with resin beads or resin fines during the upflow regeneration. Furthermore, between the weak base anion exchange bed 110 and the first strong base anion exchange bed 120, in particular at the inlet of the bed 120, an inert resin layer 124 may be arranged in order to facilitate a more homogenous distribution of the water to be treated within the counter-current ion exchange unit 100. This resin layer 124 prevents also the top nozzles of the bed 120 to be blocked with resin beads or resin fines during the upflow regeneration process. Moreover, between the first strong base anion exchange bed 120 and the second strong base anion exchange bed 130, in particular at the inlet of the bed 130, an inert resin layer 134 may be arranged in order to facilitate a more homogenous distribution of the water to be treated within the counter-current ion exchange unit 100. This resin layer 134 prevents also the top nozzles of the bed 130 to be blocked with resin beads or resin fines during the upflow regeneration process such as depicted in FIG. 2b.

The water exiting the outlet 106 of the counter-current ion exchange unit 100 preferably has a boron concentration below 100 ppt (parts per trillion) and may be passed through subsequent treatment sections such as a make-up section and/or a polishing section.

In particular, it may be within the scope of the invention that the water exiting the counter-current ion exchange unit 100 is passed through further treatment units such as degassing units, deionizing units, UV treating units, ultrafiltration units, reverse osmosis units, or the like.

The first strong base anion exchange bed 120, in particular an outlet thereof, is preferably connected to a silicon analyzer 140 (preferably a dissolved silica analyzer) via a silica sampling line 145.

When the first strong base anion exchange bed 120 becomes exhausted and the measured silica concentration exceeds a defined concentration, preferably a concentration of 20 ppb (parts per billion), the treating process is interrupted and the anion exchange beds 130; 120; 110 are regenerated in series (thoroughfare regeneration) in a counter-current modus, i.e. in the sequence of the second strong base anion exchange bed 130, the first strong base anion exchange bed 120 and the weak base anion exchange bed 110, as shown in FIG. 1b and FIG. 2b (and illustrated by the arrowhead).

For regeneration of the anion exchange beds 130; 120; 110, the counter-current ion exchange unit 100 is typically fed with a regeneration solution, preferably a warm sodium hydroxide solution, via the outlet 106.

Further, an outlet of the second strong base anion exchange bed 130 is preferably connected to a boron analyzer 150 via a boron sampling line 155.

For being able to monitor boron concentration in an operational state of the treatment process, the boron analyzer 150 may require a resistivity of the sample water above 15 Mohm·cm. To this end, a strong acid cation exchange bed 160, typically being configured as a small column, may be arranged between the boron analyzer 150 and the outlet of the second strong base anion exchange bed 130.

The strong acid cation exchange bed 160 increases resistivity by exchanging protons ($H^+$-Ions) against sodium cations exiting the second strong base anion exchange bed 130.

When the second strong base anion exchange bed 130 becomes exhausted and the boron breakthrough and elution, respectively from the second strong base anion exchange bed 130 exceeds a defined concentration, preferably a concentration of 100 ppt (parts per trillion), the treating process is also interrupted and the anion exchange beds 130; 120; 110 are also regenerated in series in a counter-current mode, as shown in FIG. 1b and FIG. 2b (and illustrated by the arrowhead).

In summary, a significant reduction of boron leakage can be accomplished by arranging a further strong base anion exchange bed (directly downstream) of a first strong base anion exchange bed, with the further strong base anion exchange bed being primarily provided for removing boron displaced by an impurity front, in particular silica front.

In order to further minimize boron leakage, silica concentration upstream of the further strong base anion exchange bed and/or boron concentration downstream of the further strong base anion exchange bed can be monitored and the anion exchange beds can be regenerated in series in a counter-current mode when the silica and/or boron concentration exceeds defined threshold values, preferably as disclosed in the present description. By doing so, the further strong base anion exchange bed is primarily loaded with boron and is concurrently kept in a highly regenerated state.

The invention claimed is:

1. A process for treating water comprising the steps of:
passing a decationized water stream through a counter-current ion exchange unit comprising:
a single column having
a separate first strong base anion exchange chamber, and
a separate second strong base anion exchange chamber,
the counter-current ion exchange unit further including:
a first strong base anion exchange bed in the first strong base anion exchange chamber, with a top liquid permeable base, and
a second strong base anion exchange bed in the second strong base anion exchange chamber, with another top liquid permeable base, the second strong base anion exchange bed being arranged downstream of the first strong base anion exchange bed, so that the decationized water stream passes through the first strong base anion exchange bed and then through the second strong base anion exchange bed,
monitoring silica concentration of the water stream at a location upstream of the second strong base anion exchange bed,
monitoring boron concentration of the water stream at a location downstream of the second strong base anion exchange bed, and
regenerating the counter-current ion exchange unit by passing a regeneration solution through the single column through the second strong base anion exchange bed and then through the first strong base anion exchange bed when one of the silica concentration and the boron concentration exceeds a defined threshold value.

2. The process according to claim 1, wherein a sample of the water stream is passed through a strong acid cation exchange bed downstream of the second strong base anion exchange bed, with the strong acid cation exchange bed being arranged between the second strong base anion exchange bed and a boron analyzer.

3. The process according to claim 1, wherein the anion exchange beds are regenerated when the silica concentration exceeds a defined threshold value of 20 ppb.

4. The process according to claim 1, wherein the anion exchange beds are regenerated, when the boron concentration exceeds a defined threshold value of 100 ppt.

5. The process according to claim 1, wherein there is an inert resin layer between the first strong base anion exchange bed and the top liquid permeable base, and wherein there is another inert resin layer between the second strong base anion exchange bed and the another top liquid permeable base.

6. The process according to claim 1, wherein the regeneration solution is a sodium hydroxide solution.

7. A process for treating water comprising the steps of:
passing a decationized water stream through a counter-current ion exchange unit comprising:
a single column having
a weak base anion exchange bed chamber,
a separate first strong base anion exchange chamber, and
a separate second strong base anion exchange chamber,
the counter-current ion exchange unit further including:
a weak base anion exchange bed in the weak base anion exchange bed chamber, with a top liquid permeable base,
a first strong base anion exchange bed in the first strong base anion exchange chamber, with another top liquid permeable base, the first strong base anion exchange bed being arranged downstream of the weak base anion exchange bed, and
a second strong base anion exchange bed in the second strong base anion exchange chamber, with still another top liquid permeable base, the second strong base anion exchange bed being arranged downstream of the first strong base anion exchange bed so that the decationized water stream passes through the weak base anion exchange bed, then the first strong base anion exchange bed and then through the second strong base anion exchange bed,
monitoring silica concentration of the water stream at a location upstream of the second strong base anion exchange bed,
monitoring boron concentration of the water stream at a location downstream of the second strong base anion exchange bed, and
regenerating the counter-current ion exchange unit by passing a regeneration solution through the single column through the second strong base anion exchange bed, then through the first strong base anion exchange bed, and then through the weak base anion exchange bed when one of the silica concentration and the boron concentration exceeds a defined threshold value.

8. The process according to claim 7, wherein there is an inert resin layer between the weak base anion exchange bed and the top liquid permeable base, and wherein there is another inert resin layer between the first strong base anion exchange bed and the another top liquid permeable base, and wherein there is still another inert resin layer between the second strong base anion exchange bed and the still another top liquid permeable base.

9. The process according to claim 7, wherein the regeneration solution is a sodium hydroxide solution.

* * * * *